July 8, 1952 — R. AITKEN — 2,602,166
CHAMBER POT

Filed Sept. 30, 1948 — 2 SHEETS—SHEET 1

Inventor
Roy Aitken
By Young, Emery & Thompson
Attorneys

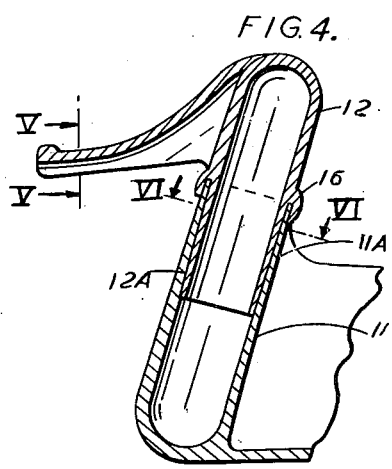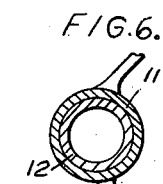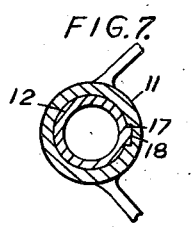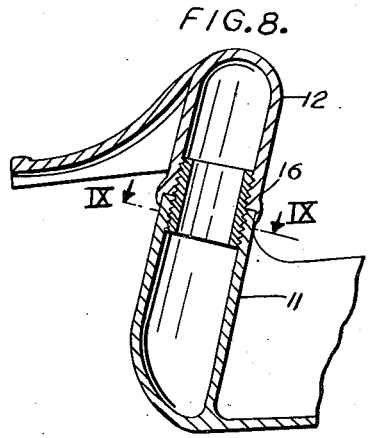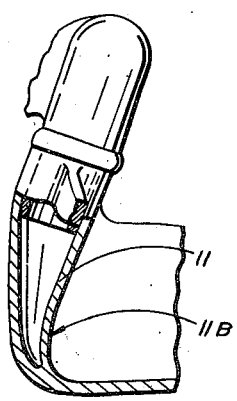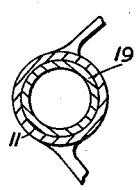

Patented July 8, 1952

2,602,166

UNITED STATES PATENT OFFICE 2,602,166

CHAMBER POT

Roy Aitken, Glasgow, Scotland

Application September 30, 1948, Serial No. 51,933
In Great Britain October 1, 1947

4 Claims. (Cl. 4—141)

This invention relates to chamber pots, its chief object being to provide such an article which is advantageous for use by young children in that, in use of the article, passage of fluid or spray over the top edge is prevented or mitigated.

A further object of the invention is to provide a chamber pot manufactured by a moulding, pressing or like operation on a plastic, metal or the like material, said pot being free from distortion or warping.

Figure 1:
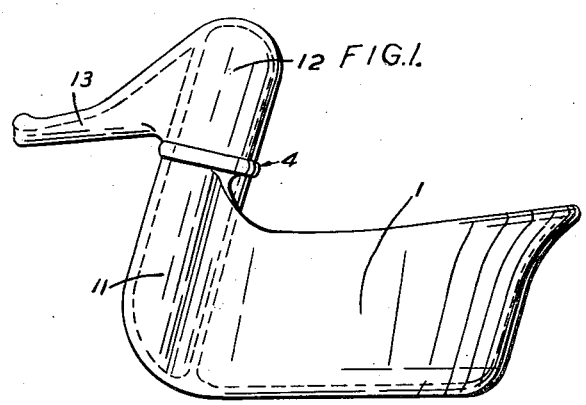
Figure 2:
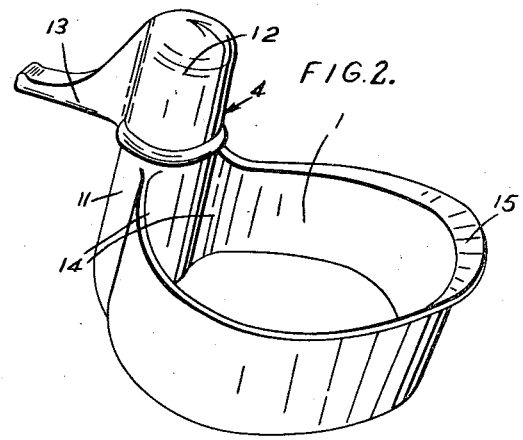
Figure 3:
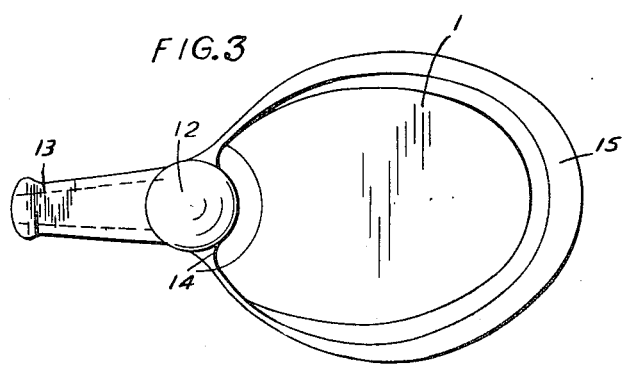

Embodiments of the invention will now be described, but merely by way of example, with reference to the accompanying drawings in which:

Figs. 1 to 3 are respectively side elevation perspective view, and plan view of one embodiment, made of plastic, Fig. 4 is a fragmentary sectional view of Fig. 3, Fig. 5 is a fragmentary sectional view on the line V—V of Fig. 4, Fig. 6 is a sectional view on the line VI—VI of Fig. 4, Fig. 7 is a view similar to Fig. 6, showing a modification, Fig. 8 is a view similar to Fig. 6, showing a modification, Fig. 9 is a sectional view on the lines IX—IX of Fig. 8, Fig. 10 is a view similar to Fig. 4, showing a modification.

Referring to the embodiments shown, the pot is made by moulding a synthetic plastic. The receptacle part 1 has walls of uniform thickness, and an upwardly extending substantially cylindrical hollow column 4 is provided which extends from the bottom of the receptacle part 1 upwards beyond the rim thereof and presents in transverse section an outer periphery free from concavity. The column 4 is in two parts, namely a lower tubular part 11 formed integral with the part 1, and an upper, separately moulded part, in the shape of a duck's head, consisting of a hollow upright neck 12 having a grippable extension 13 projecting laterally in a direction away from the part 1 and shaped in the form of a beak. The tubular part 11 merges smoothly with the walls of part 1, and has at each side thereof, between it and the part 1, upwardly extending concavities 14, concave in plan view (Fig. 3). The column 4, as shown, extends upwardly and slightly rearwardly, that is, towards the remote side of the part 1. The beak 13 is recessed to inverted channel shape in cross-section (Fig. 5). The neck 12 extends directly upwards from the opening defined by the rim of the receptacle 1 and so serves to deflect impinging fluid or spray downwards through said opening.

The upper edge of the part 1 flares outwardly towards the rear as at 15, to form a comfortable seat.

In this way uniform thickness is achieved throughout the whole article, and hence the time necessary for curing (or the "dwell") during the moulding operation is the same for all parts, and this ensures the minimum moulding time for the whole article and thus keeps production costs at the minimum. Moreover there is no tendency for distortion due to unequal cooling, and there is a saving in material.

The neck 12 has an integral skirt 16, and tapered external walls 12A which form a wedging fit in the corresponding tapered internal walls 11A of the part 11, the skirt 16 serving to conceal the joint between the parts 11 and 12. In Fig. 7 a key 17 on the part 12 engages in a keyway 18 on the part 11 to prevent rotation of the part 12.

In Figs. 8 and 9, a screw-threaded metal ferrule 19 is screwed into and projects from the upper end of the part 11, and the part 12 is tapped and screws on to the ferrule, the line of jointure of the parts 11 and 12 being covered by the skirt 16.

In Fig. 10 the walls of the part 11 converge downwardly and the inner wall is concave as at 11B.

It will be understood that the parts 11 and 12 may be secured together in any convenient manner, for example, by a wedging fit, with or without keying, and with or without adhesive, or by screwing one into the other.

As a result of the invention a reduction in curing time as applied to plastic moulding of the order of say seventy-five per cent may be obtainable as against a similar article made entirely solid.

The pot in the foregoing embodiments may be made of any convenient material other than synthetic plastic material, for example, papier-mâché, glass, china, wood, metal, or any other convenient solid.

I claim:

1. A chamber pot comprising a dished receptacle having formed integrally with the walls thereof a substantially cylindrical column extending from the bottom of the receptacle upwards beyond the receptacle rim and presenting in transverse section an outer periphery free from concavity, a face of the column extending directly upwards from the opening defined by said rim so as to deflect impinging fluid or spray downwards through said opening into the receptacle, and a manually grippable handle projecting laterally from the upper portion of the column in a direction away from the receptacle.

2. A chamber pot moulded of synthetic plastic material, comprising a hollow column formed of upper and lower, separately moulded, interconnected tubular portions, a dished receptacle extending laterally from and integral with the lower portion of the column, and a manually grippable handle integral with the upper portion of the column and extending laterally therefrom in a direction away from the receptacle, a face of the column extending directly upwards from the opening defined by the receptacle rim so as to deflect impinging fluid downwards through said opening into the receptacle.

3. A chamber pot moulded of synthetic plastic material, comprising a hollow column formed of upper and lower separately moulded tubular portions, tapered external walls at the end of one portion, and correspondingly tapered internal walls at the end of the other portion, the ends of the portions being a wedge fit one within the other to interconnect the portions, a dished receptacle extending laterally from and integral with the lower portion of the column, and a manually grippable handle integral with the upper portion of the column and extending laterally therefrom in a direction away from the receptacle, a face of the column extending directly upwards from the opening defined by the receptacle rim so as to deflect impinging fluid downwards through said opening into the receptacle.

4. A chamber pot moulded of synthetic plastic material, comprising a hollow cylindrical column formed of upper and lower separately moulded cylindrical tubular portions, tapered external walls at the end of one portion and correspondingly tapered internal walls at the end of the other portion, the ends of the portions being a wedge fit one within the other to interconnect the portions, a key-and-groove connection between the interengaging ends of the portions to prevent rotation of one portion relatively to the other, a dished receptacle extending laterally from and integral with the lower portion of the column, and a manually grippable handle integral with the upper portion of the column and extending laterally therefrom in a direction away from the receptacle, a face of the column extending directly upwards from the opening defined by the receptacle rim so as to deflect impinging fluid downwards through said opening into the receptacle.

ROY AITKEN.

REFERENCES CITED

The following references are of record in the file of this patent:

UNITED STATES PATENTS

| Number | Name | Date |
| --- | --- | --- |
| 897,434 | Waltz | Sept. 1, 1908 |
| 1,227,022 | Thompson | May 22, 1917 |
| 2,304,631 | Ensing | Dec. 8, 1942 |

FOREIGN PATENTS

| Number | Country | Date |
| --- | --- | --- |
| 4,490 | Great Britain | Feb. 21, 1914 |
| 10,051 | Great Britain | Apr. 25, 1910 |
| 238,662 | Great Britain | Aug. 27, 1925 |